(12) United States Patent  
Goto

(10) Patent No.: US 8,073,325 B2
(45) Date of Patent: Dec. 6, 2011

(54) OSNR MEASURING APPARATUS AND OSNR MEASURING METHOD

(75) Inventor: Ryosuke Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1096 days.

(21) Appl. No.: 11/830,950

(22) Filed: Jul. 31, 2007

(65) Prior Publication Data

US 2008/0080857 A1 Apr. 3, 2008

(30) Foreign Application Priority Data

Sep. 28, 2006 (JP) ................................ 2006-265632

(51) Int. Cl.
H04B 10/08 (2006.01)
H04B 17/00 (2006.01)

(52) U.S. Cl. .............................. 398/26; 398/25; 398/162

(58) Field of Classification Search .................... 398/25, 398/26, 30, 34, 162
See application file for complete search history.

(56) References Cited

U.S. PATENT DOCUMENTS

| | | | |
|---|---|---|---|
| 5,225,922 A | | 7/1993 | Chraplyvy et al. |
| 5,808,760 A | * | 9/1998 | Gfeller ............................ 398/27 |
| 6,760,391 B1 | * | 7/2004 | Alb et al. ....................... 375/354 |
| 6,839,162 B2 | | 1/2005 | Sekiya et al. |
| 6,952,529 B1 | * | 10/2005 | Mittal ............................. 398/26 |
| 2002/0015201 A1 | * | 2/2002 | Zhou et al. .................... 359/124 |
| 2004/0184810 A1 | * | 9/2004 | Spilman et al. ............... 398/139 |
| 2006/0012786 A1 | * | 1/2006 | Goto et al. .................... 356/328 |
| 2009/0196602 A1 | * | 8/2009 | Saunders et al. ............... 398/26 |

FOREIGN PATENT DOCUMENTS

| | | |
|---|---|---|
| JP | 6-69891 | 3/1994 |
| JP | 2001-244528 A | 9/2001 |
| JP | 2002-261814 | 9/2002 |
| JP | 2003-042906 A | 2/2006 |

OTHER PUBLICATIONS

Yoon, Hosung, et al., "Performance Comparison of Optical 8-ary Differential Phase-Shift Keying Systems with Different Electrical Decision Schemes", Jan. 24, 2005, Optics Express, vol. 13, No. 2, pp. 371-376.*

"Japanese Office Action", mailed by JPO and corresponding to Japanese application No. 2006-265632 on Apr. 19, 2011, with partial English translation.

* cited by examiner

Primary Examiner — Kenneth N Vanderpuye
Assistant Examiner — Daniel Dobson
(74) Attorney, Agent, or Firm — Fujitsu Patent Center

(57) ABSTRACT

An apparatus for measuring an OSNR for a communication channel in a WDM optical communications system includes a signal control unit, a receiving unit, and a measuring unit. The signal control unit controls spectral width reduction for an optical signal sent through a target channel. The receiving unit receives spectral data measured from the optical signal received by the target channel under control of the control unit. The measuring unit, based on the spectral data received by the receiving unit, measures the OSNR of the target channel.

10 Claims, 12 Drawing Sheets

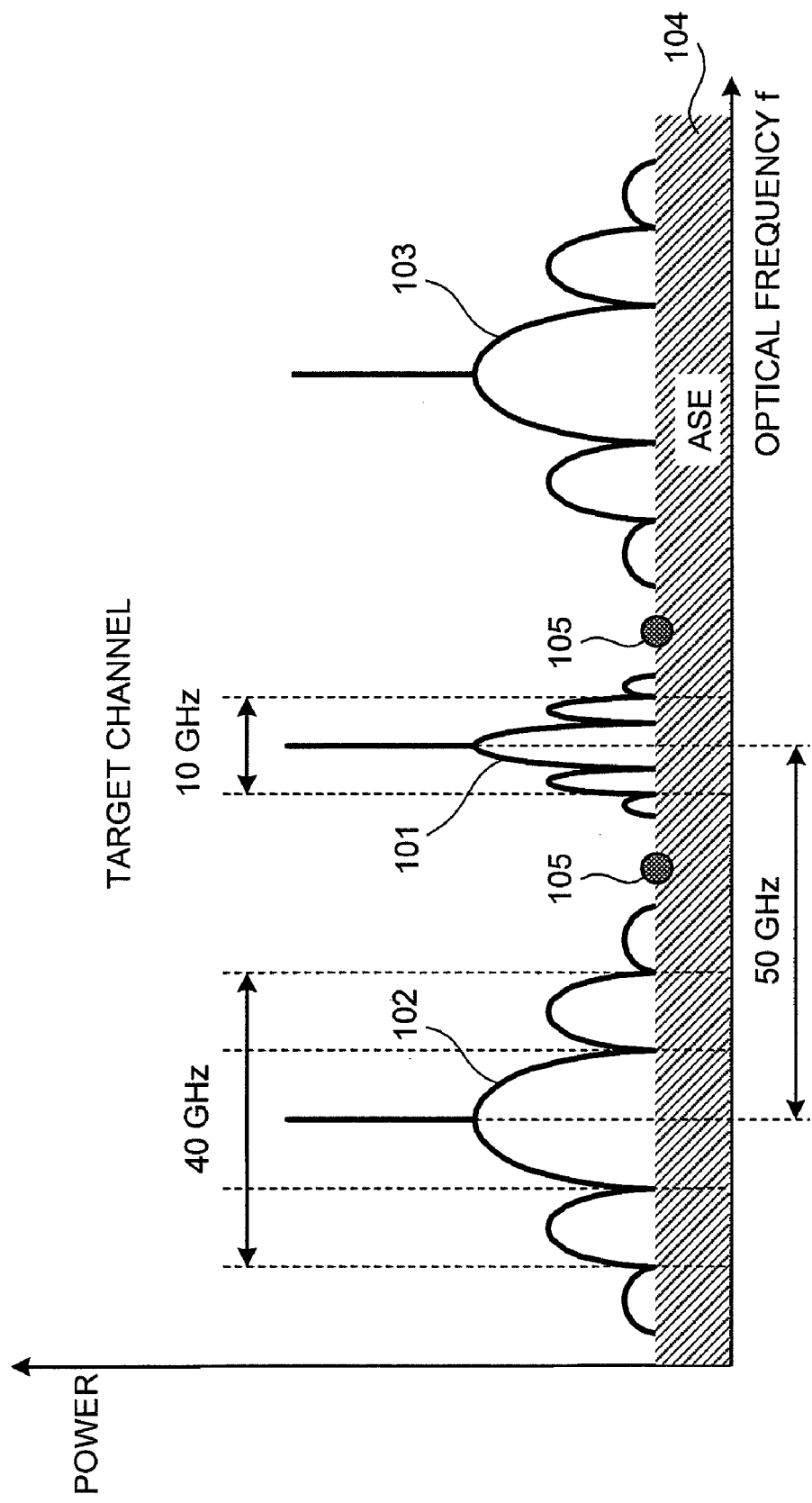

OSNR MEASURING APPARATUS AND OSNR MEASURING METHOD

CROSS-REFERENCE TO RELATED APPLICATIONS

This application is based upon and claims the benefit of priority from the prior Japanese Patent Application No. 2006-265632, filed on Sep. 28, 2006, the entire contents of which are incorporated herein by reference.

BACKGROUND OF THE INVENTION

1. Field of the Invention

The present invention relates to optical signal noise ratio (OSNR) measurement in an optical communication system.

2. Description of the Related Art

Corresponding to an increased volume of information communicated in recent years, research and development related to high capacity, low cost fiber optic communications systems has surged. To further increase capacity and to lower cost, wavelength division multiplexing (WDM), a method for sending multiple wavelengths (that are multiplexed signals) along a single optical fiber, has been and continues to be extensively researched and developed.

Channel spacing, an index of multiplexing, has been standardized by the Telecommunications Standardized Sector of the International Telecommunications Union (ITU). Currently among standard WDM systems, a typical system multiplexes a 10-gigabit per second (Gbps) signal which is the signal transmission capacity for one channel having a 100-gigahertz (GHz) (approximately 0.8 nano meters (nm)) spacing or a 50-GHz (approximately 0.4 nm) spacing.

In WDM systems, an erbium doped fiber amplifier (EDFA) is commonly used as a repeater to offset optical fiber line loss. In systems employing EDFA, amplified spontaneous emission (ASE) is generated becoming noise causing bit error rate (BER) increases. As such, the optical signal noise ratio (OSNR) evaluation becomes important.

Since multiple channels transmit simultaneously, OSNR for the receiving end (after transmission) of each channel differs for each channel. Additionally, the BER of each channel also varies. As such, the quality of transmission among channels becomes unequal. Hence, to optimize the transmission level of each channel such that the transmission quality becomes equivalent, preemphasis is commonly employed. Japanese Patent Application Laid-Open Publication No. H6-69891 is an example of such an application.

In the process of preemphasis, since the level of each channel on the transmission side is determined based on OSNR, OSNR must be accurately measured. Spectrum monitors are employed to measure the spectral and ASE component of the signal (below, a "spectrum analyzer" is also given as an example of a spectrum monitor) and calculation based on these measurements provides the highest accuracy.

Accompanying increased WDM optical communication transmission capacity, per channel bit rates have increased (improved speed), and channel spacing has decreased. Along with these advancements, the following problems related to measurement by spectrum analyzer have arisen.

In order for the spectrum analyzer to accurately measure OSNR, the extent to which the spectrum of signal component and component of noise (in this case, primarily ASE) can be accurately separated and measured becomes very important. The entire signal spectrum must be within the resolution band of the spectrum analyzer. As such, the total power of the signal component can be accurately measured. Further, with regard to the ASE component, extraneous components (e.g., signal spectrum) must be blocked from entering the resolution band of the spectrum analyzer.

FIG. 12 is a graph illustrating a WDM signal spectrum for a 50-GHz channel spacing in which the signal for each channel is 10 Gbps and modulated as non-return-to-zero (NRZ). The x-axis represents optical frequency f, while the y-axis represents a measured spectral power. Reference characters 1201, 1202, and 1203 indicate signal spectrums of each channel. Reference character 1204 indicates the ASE component that arises from the EDFA. Furthermore, the signal spectrum 1201 is the signal spectrum of the target channel for which the OSNR measurement is sought.

As illustrated in FIG. 12, the bit rate for one channel is high (each signal spectrum width increases). Further, if channel spacing decreases, the ASE component 1204 is buried by the bases of the signal spectrums 1201, 1202, and 1203. Therefore, the ASE component 1204 cannot to be accurately measured.

At the same time, if the resolution is increased too much in order to enhance accuracy of ASE component measurement, the entire signal spectrum of the target channel (the signal spectrum 1201) does not fall within the resolution band, leading to the problem of not being able to accurately measure the signal spectrum.

FIG. 13 is a graph illustrating a WDM signal spectrum for a 50-GHz channel spacing. The signals 1201, 1202, and 1203 for each channel are depicted as optical continuous waves (CW). As illustrated in FIG. 13, the bit rate becomes zero when each of the signals is an optical CW and hence the width of the signals 1201, 1202, and 1203 diminishes and the problem of the not being able to measure the ASE component because of the signals 1201, 1202, and 1203 burying the ASE component does not arise.

FIG. 14A is a graph of a 40-Gbps "return to zero-differential quadrature phase shift keying" (RZ-DQPSK) signal spectrum measurement calculation example (resolution 0.1 nm). FIG. 14B illustrates the signal measurement calculation in FIG. 14A over a 100-GHz channel spacing for three channels (resolution 0.1 nm). In both FIG. 14A and FIG. 14B, as an example of modulation, the signal spectrum results calculated by the RZ-DQPSK method are illustrated (resolution 0.1 nm). RZ-DQPSK is a four-phase modulation in which differential coding of a data signal is achieved and has a signal format that returns to zero within the bit interval.

In both FIG. 14A and FIG. 14B, the x-axis represents the relative frequency of the RZ-DQPSK signal and the y-axis represents the measured relative optical power. In the figures, reference character 1401 depicts the signal spectrum of the target channel (corresponds to the signal 1201). Furthermore, in FIG. 14B, reference characters 1402 and 1403 depict signals of the channels adjacent to the target channel (corresponds to the signals 1202 and 1203 above).

As apparent by FIG. 14B, if the bit rate for one channel is high (40 Gbps) and in addition if the channel spacing is narrow (100 GHz), the bases of the signals 1401, 1402, and 1403 of each channel overlap each other. The problematic ASE component is not illustrated. In this case, the resolution of the spectrum analyzer is 0.1 nm.

FIG. 15A, FIG. 15B, and FIG. 15C depict the signal spectrum illustrated in FIG. 14B and ASE component.

In each of the figures, FIG. 15A, FIG. 15B, and FIG. 15C, the power of the ASE component is different and as such, the measured value of OSNR also varies among figures. In FIG. 15A, FIG. 15B, and FIG. 15C, reference character 1501 represents the actual OSNR and reference character 1502 represents the measured OSNR. Reference character 1503 depicts the ASE component.

In the example shown in FIG. 15A, the actual OSNR 1501 is 40 decibels (dB) and the measured OSNR 1502 is 23.5 dB. In the example shown in FIG. 15B, the actual OSNR 1501 is 30 dB and the measured OSNR 1502 is 22.2 dB. In the example shown in FIG. 15C, the actual OSNR 1501 is 20 dB and the measured OSNR 1502 is 16.4 dB.

Furthermore, reference character 1504 depicts an optical CW for each channel. Compared to the optical CW signal 1504, the modulated signals 1401, 1402, and 1403 have a greater spectrum width and lower spectral power peak.

Hence, in addition to the bit rate for one channel being high, if the channel spacing is also narrow, the bases of each channel become overlapped and the signal spectrum of the ASE component 1503 becomes buried. Furthermore, the modulated signals 1401, 1402, and 1403 have lower peak powers compared to the optical CW 1504. As such, it becomes apparent that the actual OSNR 1501 can not be accurately measured.

SUMMARY OF THE INVENTION

It is an object of the present invention to at least solve the above problems in the conventional technologies.

A measuring apparatus according to one aspect of the present invention measures an optical signal noise ratio (OSNR) of a communication channel in a wavelength division multiplexing (WDM) optical communications system. The measuring apparatus includes a reducing unit that reduces spectral width an optical signal sent to a target channel; a receiving unit that receives spectral data measured from the optical signal, and a measuring unit that measures the OSNR of the target channel based on the spectral data.

A measuring method according to another aspect of the present invention is of measuring an OSNR of a communication channel in a WDM optical communications system. The measuring method includes reducing spectral width an optical signal sent to a target channel; receiving spectral data measured from the optical signal, and measuring the OSNR of the target channel based on the spectral data.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a diagram illustrating an overview of the present invention;

DETAILED DESCRIPTION OF THE PREFERRED EMBODIMENTS

Exemplary embodiments of the present invention will now be described in detail with reference to the accompanying drawings.

Figure 12:
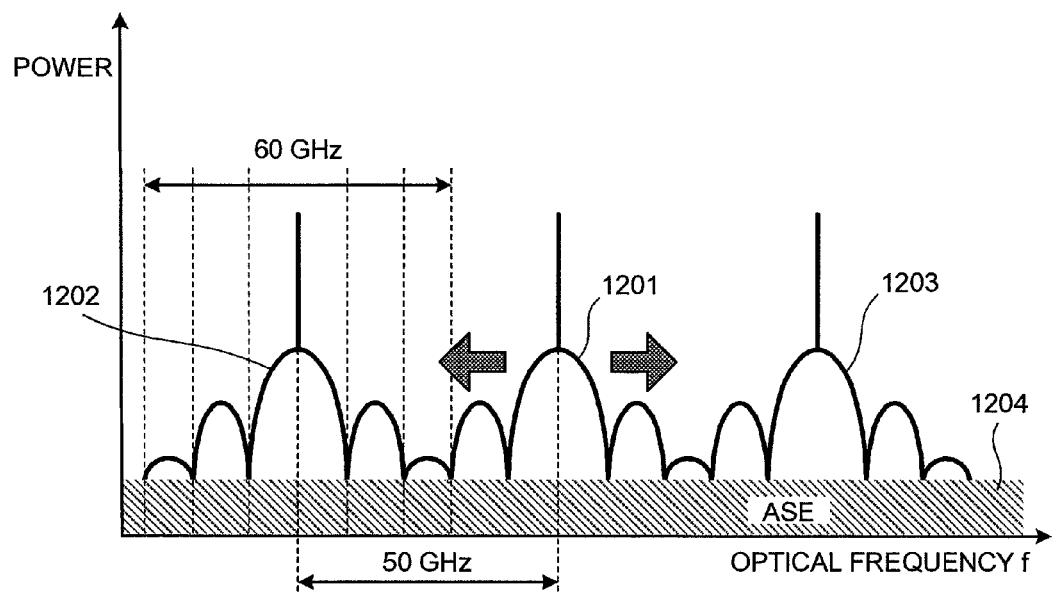
FIG. 12 is a graph illustrating a WDM signal spectrum for a 50-GHz channel spacing.
Figure 13:
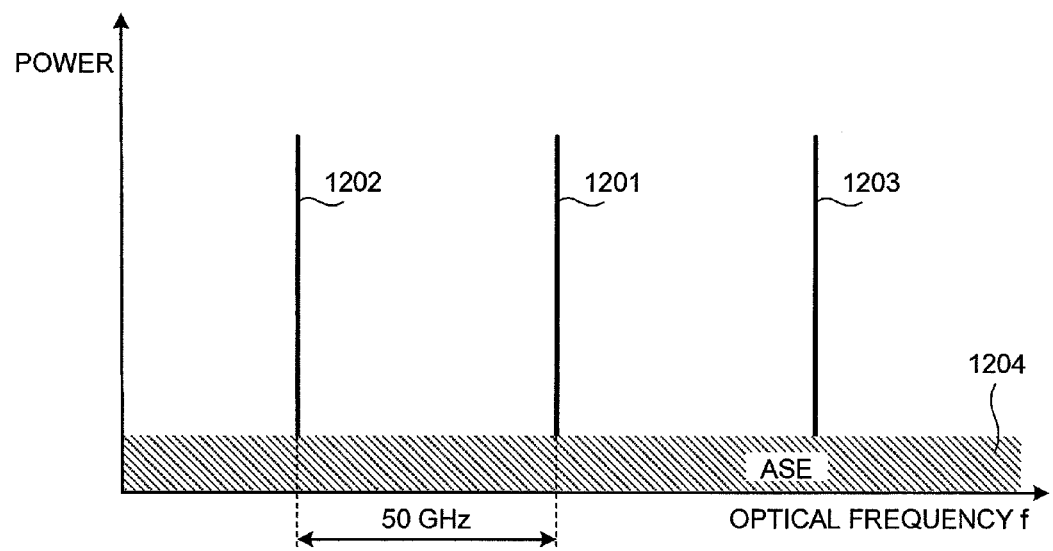
FIG. 13 is a graph illustrating a WDM signal spectrum for the 50-GHz channel spacing.
Figure 14A:
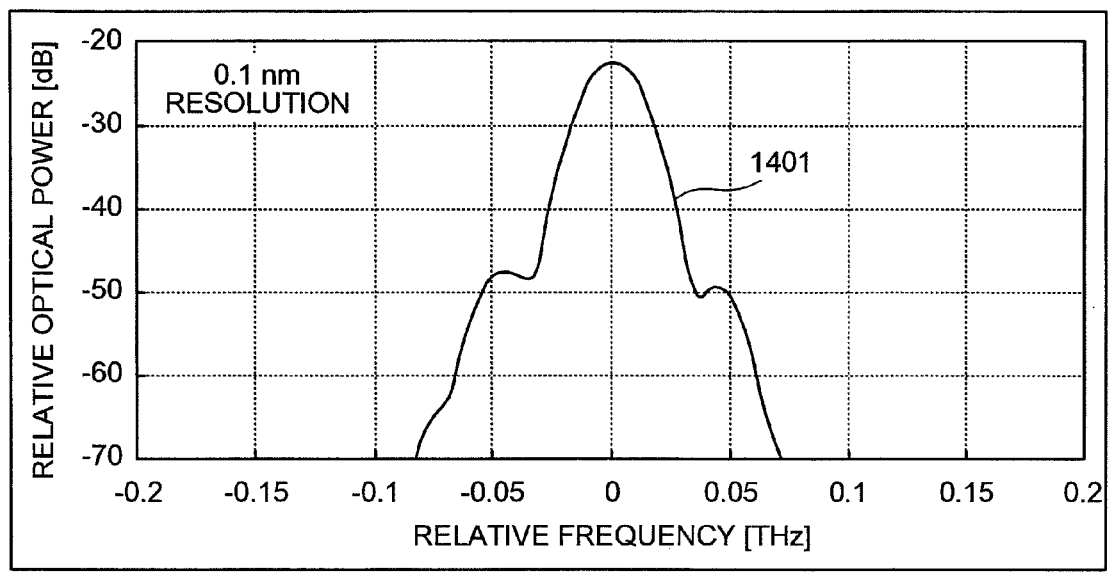
FIG. 14A is a graph of a 40-Gbps RZ-DQPSK signal spectrum measurement calculation example (resolution 0.1 nm)
Figure 14B:
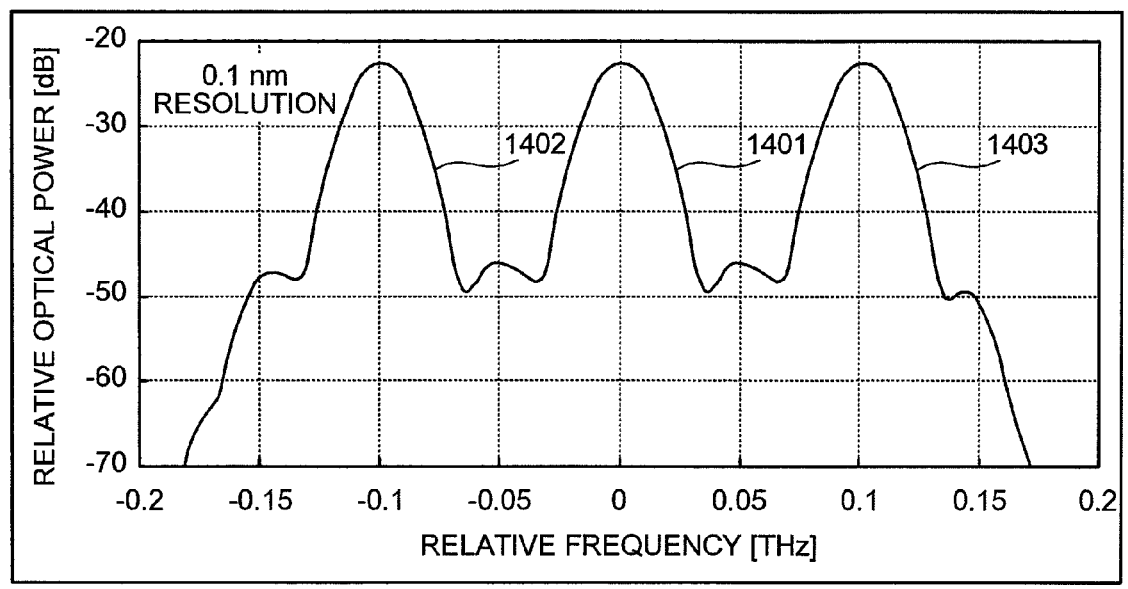
FIG. 14B is a graph illustrating the signal measurement calculation in FIG. 14A over a 100-GHz channel spacing for three channels (resolution 0.1 nm)

FIG. 1 is a graph depicting an overview of the present invention. Reference character 101 in FIG. 1 is a signal spectrum of the target channel to be measured (corresponds to the signal spectrum 1201 in FIG. 12). Reference characters 102 and 103 are signal spectrums of adjacent channels relative to the target channel. Reference character 104 is an ASE component arising from EDFA.

FIG. 1 illustrates a case in which the bit rate of the target channel (refer to reference character 1201 in FIG. 12) decreases temporarily from 10 Gbps to 2.5 Gbps under the control of the of an OSNR measuring apparatus according to embodiments of the present invention. With the decreased bit rate of the target channel, the width of the signal spectrum 101 of the target channel decreases and the overlapping of the signal spectrum 101 with the signal spectrums of the adjacent channels 102 and 103 can be avoided.

Hence, the burying of the ASE component 104 by the signal spectrum 101 and the signal spectrums 102 and 103 of the adjacent channels can also be avoided. The section of the ASE component indicated by reference character 105 can be accurately measured. Furthermore, due to the reduction of the spectrum width of the signal spectrum 101 of the target channel, if the resolution of the spectrum analyzer is appropriately selected, the signal spectrum 101 of the target channel can be measured more accurately.

Figure 2A:
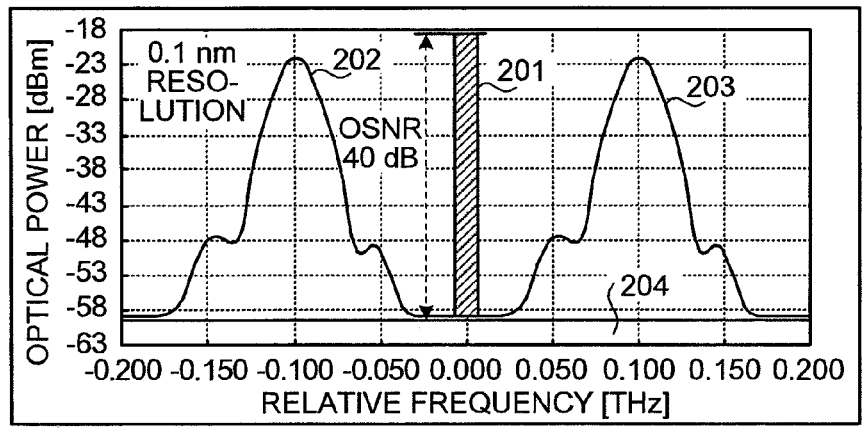
FIG. 2A is diagram illustrating a measurement calculation example when a target channel in FIG. 15A is set for an optical CW (resolution 0.1 nm)
Figure 2B:
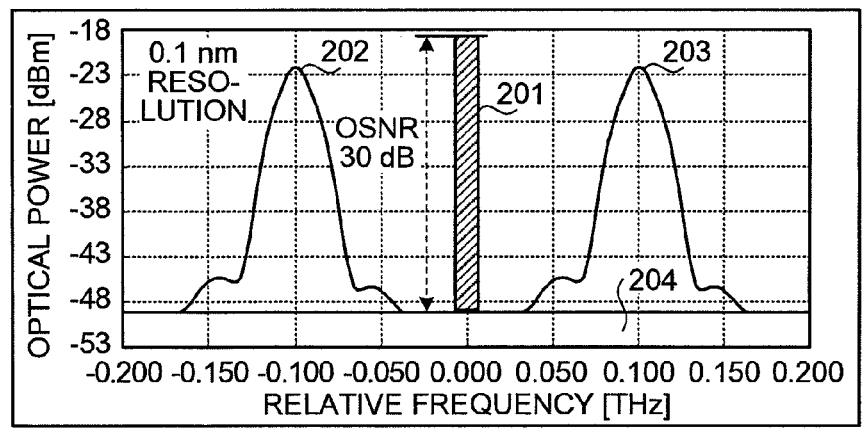
FIG. 2B is diagram illustrating a measurement calculation example when a target channel in FIG. 15B is set for an optical CW (resolution 0.1 nm)
Figure 2C:
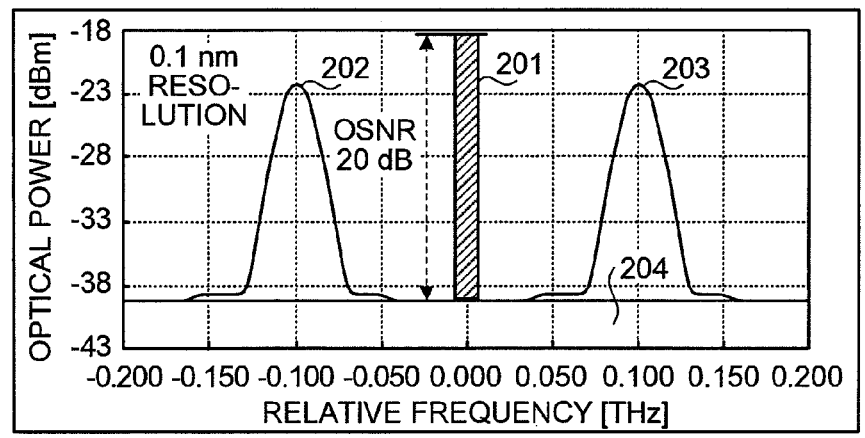
FIG. 2C is diagram illustrating a measurement calculation example when a target channel in FIG. 15C is set for an optical CW (resolution 0.1 nm)
Figure 15A:
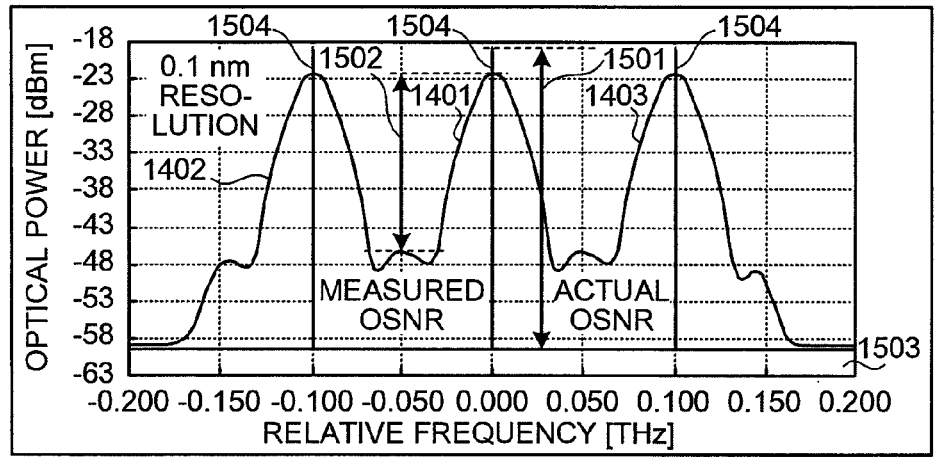
FIG. 15A is a graph illustrating the signal spectrum illustrated in FIG. 14B and ASE component.
Figure 15B:
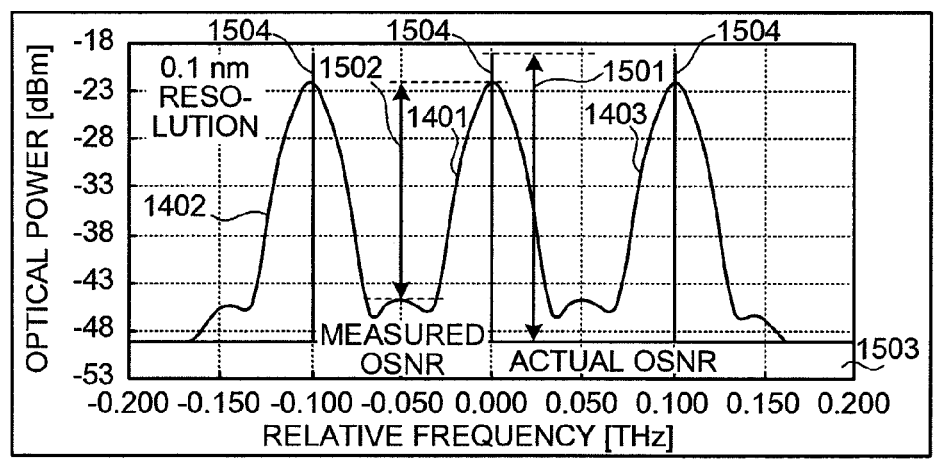
FIG. 15B is a graph illustrating the signal spectrum illustrated in FIG. 14B and ASE component.
Figure 15C:
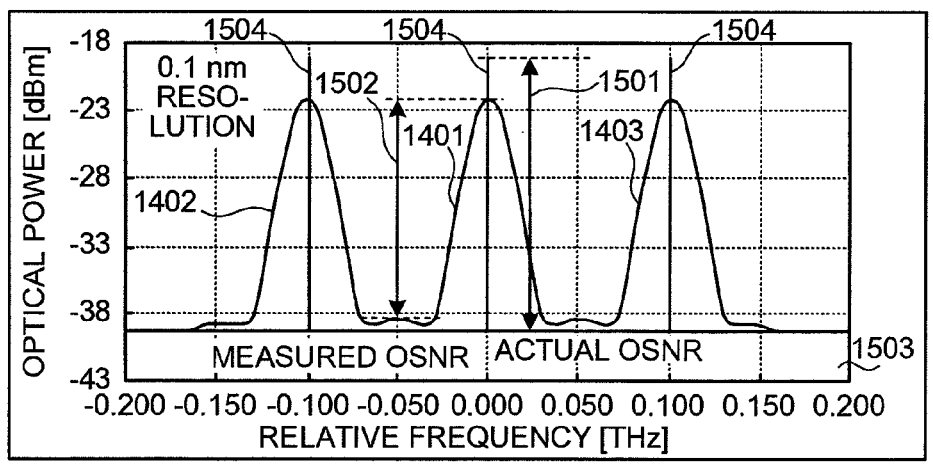
FIG. 15C is a graph illustrating the signal spectrum illustrated in FIG. 14B and ASE component.

FIG. 2A depicts a calculation example of a measurement when the target channel illustrated in FIG. 15A is set for an optical CW (resolution 0.1 nm). FIG. 2B depicts a calculation example of a measurement when the target channel illustrated in FIG. 15B is set for an optical CW (resolution 0.1 nm). FIG. 2C depicts a calculation example of a measurement when the target channel illustrated in FIG. 15C is set for an optical CW (resolution 0.1 nm). Although the signal (when set as an optical CW signal) becomes a line spectrum when measured by the spectrum analyzer because spectrums less than the resolution range of the spectrum analyzer are not displayed, the signal spectrum of the target channel in FIG. 2A, FIG. 2B, and FIG. 2C does have some width.

In FIG. 2A, FIG. 2B, and FIG. 2C, reference character 201 is the signal spectrum of the optical CW signal target channel, reference characters 202 and 203 represent a signal of channels adjacent to the target channel, and reference character 204 depicts an ASE component arising from EDFA. As illustrated in FIG. 2A, FIG. 2B, and FIG. 2C, by setting the target channel for an optical CW, the spectrum width of the signal spectrum 201 for the target channel decreases and as illustrated in the example given in FIGS. 15A, 15B, and 15C, the ASE component 204 that is buried can be accurately measured.

In the example in FIG. 2A, OSNR is 40 dB; in FIG. 2B, it is 30 dB; and in FIG. 2C, it is 20 dB. As is apparent by FIG. 2A, FIG. 2B, and FIG. 2C, the higher OSNR becomes, the range in which it is possible to measure the ASE component 204 decreases. However, in this case, by increasing the resolution of the spectrum analyzer, the spectrum width of the target channel (relative to spectrum analyzer) decreases and the ASE component 204 can be accurately measured.

However, when increasing resolution, care must be taken to increase the resolution to at least the actual spectrum width of the target channel. If the resolution is increased to a level below the spectrum width, the entire signal spectrum 201 will not fall within the resolution band and the signal spectrum 201 can no longer be accurately measured.

Further, for ease in explanation, setting of the target channel for an optical CW has been described. However, with actual optical fiber communication, due to amplifier attributes, when a CW light and a modulated optical signal pass there through, the operation conditions of the amplifier may change. Hence, application of a certain degree of (low speed) modulation of the target channel is desirable.

Figure 3:
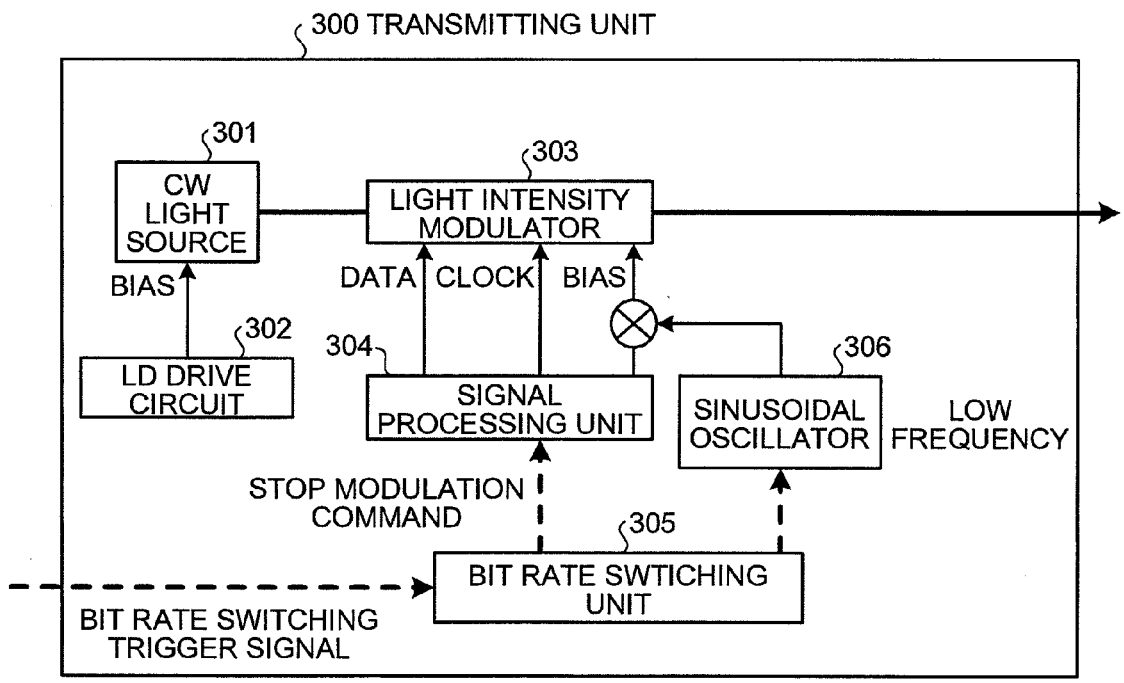
FIG. 3 is a block diagram of a transmitting unit according to an embodiment of the present invention.
Figure 4:
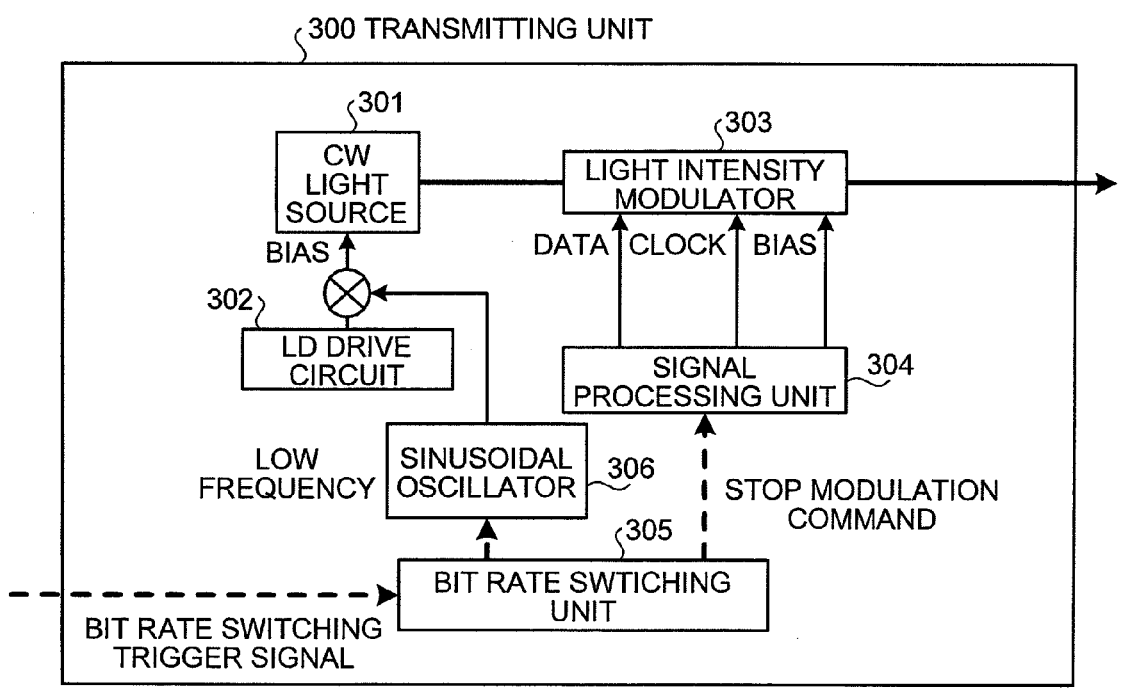
FIG. 4 is a block diagram of a modification of the transmitting unit shown in FIG. 3.

FIG. 3 is a block diagram of a transmitting unit according to an embodiment of the present invention. FIG. 4 is a block diagram of the transmitting unit illustrating a modified example. The transmitting unit is a transmitter that alters the bit rate under external control. One example of a transmitting unit is a widely employed transmitter using an intensity modulation method via external modulation. As illustrated in FIG. 3, a transmitting unit 300 includes an CW light source 301, a laser diode (LD) drive circuit 302, light intensity modulator 303, a signal processing unit 304, a bit rate switching unit 305, and a sinusoidal oscillator 306.

The CW light source 301, based on the bias current sent by the LD drive circuit, sends an optical CW to the light intensity modulator 303.

The light intensity modulator 303, under the control of the signal processing unit 304 and corresponding to the optical CW received from the CW light source 301, applies intensity modulation and generates an optical signal. The optical signal generated by the light intensity modulator 303 is transmitted via a transmission path to a receiver (not shown in figure).

The signal processing unit 304 controls the light intensity modulator 303 and applies intensity modulation to the optical CW sent from the CW light source 301 to the light intensity modulator 303. Specifically, the signal processing unit 304 sends a data signal, a clock signal and a bias current to the light intensity modulator 303. Further, the signal processing unit 304, upon receipt of a command to stop modulation by the bit rate switching unit 305, controls the light intensity modulator 303, and the intensity modulation of the optical CW ceases.

The bit rate switching unit 305, upon receipt of a bit rate switching trigger signal from an external source outside the transmitting unit 300, sends a command to the signal processing unit 304 to stop modulation. Further, as previously mentioned, if low speed modulation is required due to attributes of the amplifier, the bit rate switching unit 305 sends a command to the signal processing unit 304 to stop modulation, and controls the sinusoidal oscillator 306 such that the bias current sent from the signal processing unit 304 to the light intensity modulator 303 is superimposed with a low frequency sinusoidal wave.

The sinusoidal oscillator 306 generates low frequency sinusoidal waves, and under the control of the bit rate switching unit 305, superimposes the bias current sent from the signal processing unit 304 to the light intensity modulator 303 with a sinusoidal wave. Control on the amplifier side can be made such that operating conditions of the amplifier do not change with passage of an optical CW or a modulated optical signal. In this case, the bias current need not be superimposed with a sinusoidal wave, and the sinusoidal oscillator may be omitted.

As illustrated in FIG. 4, the sinusoidal oscillator 306 may also superimpose a low frequency sinusoidal wave on a bias current output from the LD drive circuit 302 to the CW light source 301.

Figure 5:
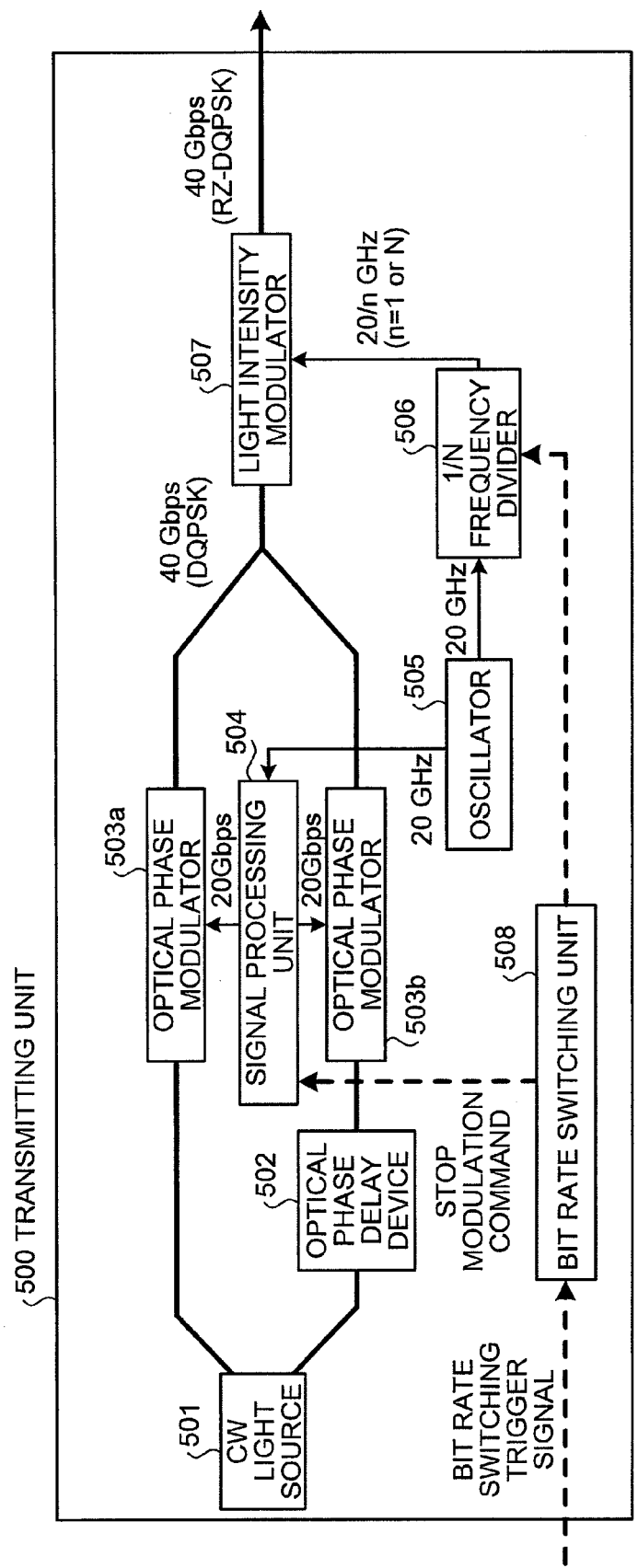
FIG. 5 is a block diagram of a transmitting unit according to the embodiment.

FIG. 5 is a block diagram of another transmitting unit according to an embodiment of the present invention. The transmitting unit is a transmitter that employs the RZ-DQPSK method as a modulation method. As illustrated in FIG. 5, a transmitting unit 500 includes an CW light source 501, an optical phase delay device 502, a first optical phase modulator 503a, a second optical phase modulator 503b, a signal processing unit 504, an oscillator 505, a 1/N frequency divider 506, a light intensity modulator 507, and a bit rate switching unit 508.

The CW light source 501, like the CW light source 301 of the transmitting unit 300, sends an optical CW to the first optical phase modulator 503a and the second optical phase modulator 503b based on the bias current sent by the LD drive circuit (not shown in FIG. 5).

The optical phase delay device 502 is situated between the CW light source 501 and the second optical phase modulator 503b, and delays the optical CW phase sent by the CW light source 501 to the second optical phase modulator 503b by one unit (or one bit).

The first optical phase modulator 503a, under the control of the signal processing unit 504, applies phase modulation to the incoming optical CW from the CW light source 501. In the same way, the second optical phase modulator 503b also, under the control of the signal processing unit 504, applies phase modulation to the incoming delayed optical CW that originated from the CW light source 501 and passed through the optical phase delay device 502.

Specifically, the first optical phase modulator 503a and the second optical phase modulator 503b conduct phase modulation based on the incoming clock signals (20 Gbps) from the signal processing unit 504. The signal phase modulated by the first optical phase modulator 503a and by the second optical phase modulator 503b are multiplexed becoming a differential quadrature phase shift keying (DQPSK) signal (40 Gbps) which is sent to the light intensity modulator 507.

The signal processing unit 504 controls the first optical phase modulator 503a and the second optical phase modulator 503b to apply phase modulation to the optical CW sent from the CW light source 501. Specifically, by sending the clock signal received from the oscillator 505 to the first optical phase modulator 503a and the second optical phase modulator 503b, the signal processing unit 504 controls the first optical phase modulator 503a and the second optical phase modulator 503b. Further, upon receiving a command to stop modulation from the bit rate switching unit 508, the signal processing unit 504 controls the light intensity modulator 507 to stop modulation of the optical CW.

The oscillator 505 sends a clock signal to the signal processing unit 504 and the light intensity modulator 507. The clock signal sent to both the signal processing unit 504 and the light intensity modulator 507 is set as 20 GHz.

The 1/N frequency divider 506 is situated between the oscillator 505 and the light intensity modulator 507, and under the control of the bit rate switching unit 508, divides the frequency of the clock signal sent from the oscillator 505 to the light intensity modulator 507 into 1/n frequencies. The 1/N frequency divider 506 sends the clock signal that has been divided into 1/n frequencies (if n=1, division is not conducted) to the light intensity modulator 507. For example, assuming the clock signal sent from the oscillator 505 to be 20 GHz and n=2, and then a 10-GHz clock signal is sent to the light intensity modulator 507.

The signals sent by the first optical phase modulator 503a and the second optical phase modulator 503b are multiplexed to become the DQPSK signal (40 Gbps) which is received by the light intensity modulator 507. The light intensity modulator 507, based on the clock signal incoming from the 1/N frequency divider 506, generates an RZ-DQPSK signal (40 Gbps) by applying intensity modulation to the incoming DQPSK signal. The RZ-DQPSK signal generated by the light intensity modulator 507 is sent to a receiver through a transmission path (not illustrated in FIG. 5).

The bit rate switching unit 508, upon receipt of an external bit rate switching trigger signal coming from outside the transmitting unit 500, sends a modulation stop command to the signal processing unit 504 and controls the 1/N frequency divider 506 to divide the frequency of the clock signal sent to the light intensity modulator 507. By dividing the clock signal sent to the light intensity modulator 507, the modulation frequency of the light intensity modulator 507 decreases.

For example, the bit rate switching unit 508 controls the 1/N frequency divider 506 to divide an incoming 20-GHz clock signal in half, i.e., into a frequency of 10 GHz. Hence, the frequency of the clock signal sent to the light intensity modulator 507 is one-half, and the modulation frequency of the light intensity modulator 507 can be reduced to one-half.

Figure 6:
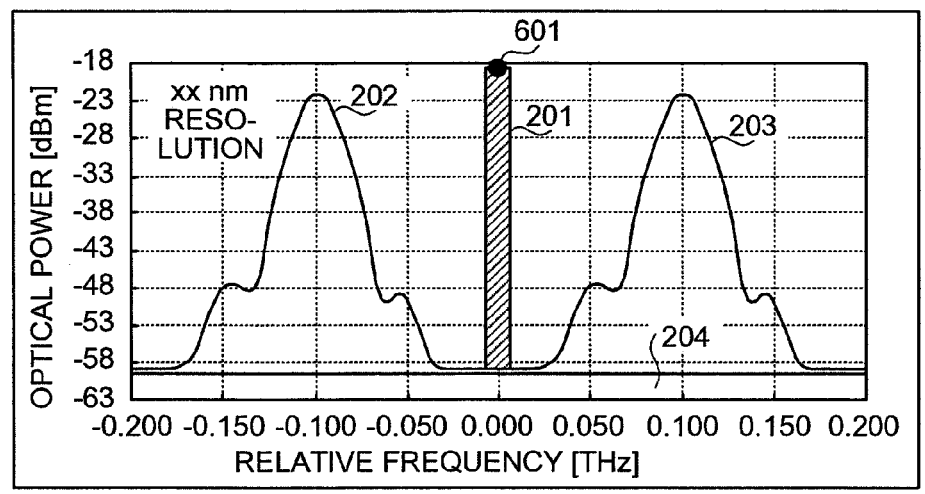
FIG. 6 is a diagram illustrating optimization of resolution.
Figure 7:
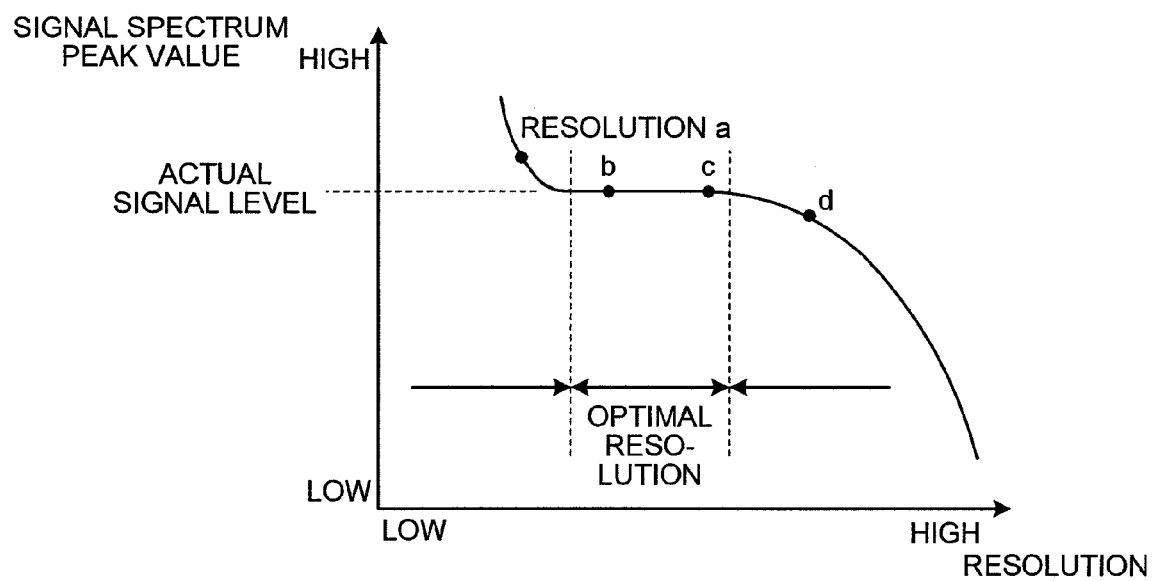
FIG. 7 is a diagram illustrating optimization of resolution.

FIG. 6 and FIG. 7 illustrate optimization of resolution. If the resolution is increased to a level below the spectrum width, the entire signal spectrum 201 will not fall within the resolution band and the signal spectrum 201 can no longer be accurately measured. At the same time, if the resolution is lowered too greatly, the base of the signals 202 and 203 fall within the resolution band and in this case as well, the signal spectrum 201 can not be accurately measured.

Hence, in order to accurately measure the signal spectrum 201, it is necessary to set an optimal resolution. FIG. 6 illustrates the spectrum calculation example shown in FIG. 2A, however, the resolution is not fixed. In the present invention, while the resolution of the spectrum analyzer is altered, a measured peak value 601 of the signal spectrum 201 (shown in FIG. 6) of the target channel is plotted. FIG. 7 is a graph plotting measured peak values of the signal spectrum 201 against changes in resolution, where the x-axis is the resolution of the spectrum analyzer and the y-axis is the measured peak of the signal spectrum 201.

As illustrated in FIG. 7, when the resolution is altered from a low value to a high value (in the figure resolution a, b, c, and d are in ascending order in terms of higher resolution), first with regard to the resolution a, the signals 202 and/or 203 of adjacent channels fall in the resolution band, hence the measured peak value becomes greater than the actual value. At the points of resolutions b and c, the signals 202 and/or 203 of adjacent channels do not fall in the resolution band. Hence, only the signal 201 of the target channel is measured and the measured peak value is consistent with the actual value.

At the point of resolution d, the signal spectrum 201 does not entirely fall within the resolution band and hence, the measured peak value is less than the actual value. From the graph, a section of the curve in which the slope of the curve is the least (in this case, the points of resolution b and c) is extracted and the measured peak value corresponding to the resolution of the extracted section is taken to be the actual signal level. Furthermore, the resolution at this point is taken to be the optimal resolution.

Figure 8:
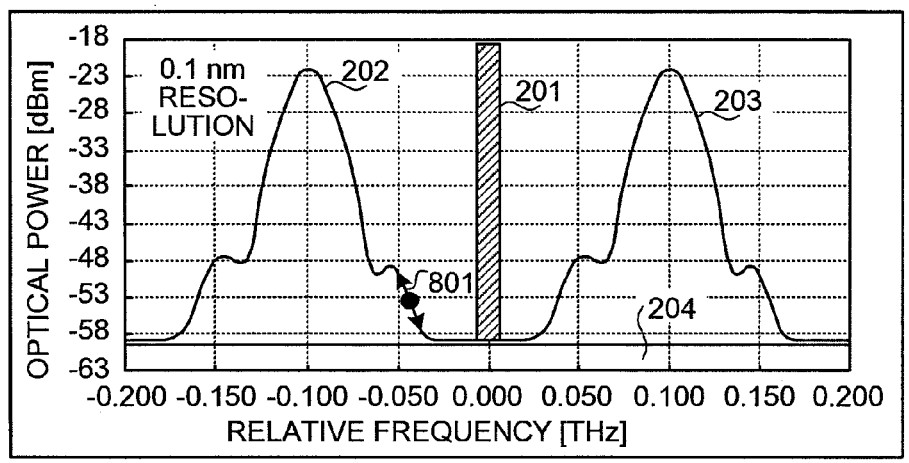
FIG. 8 is a diagram illustrating optimization of a bit rate.
Figure 9:
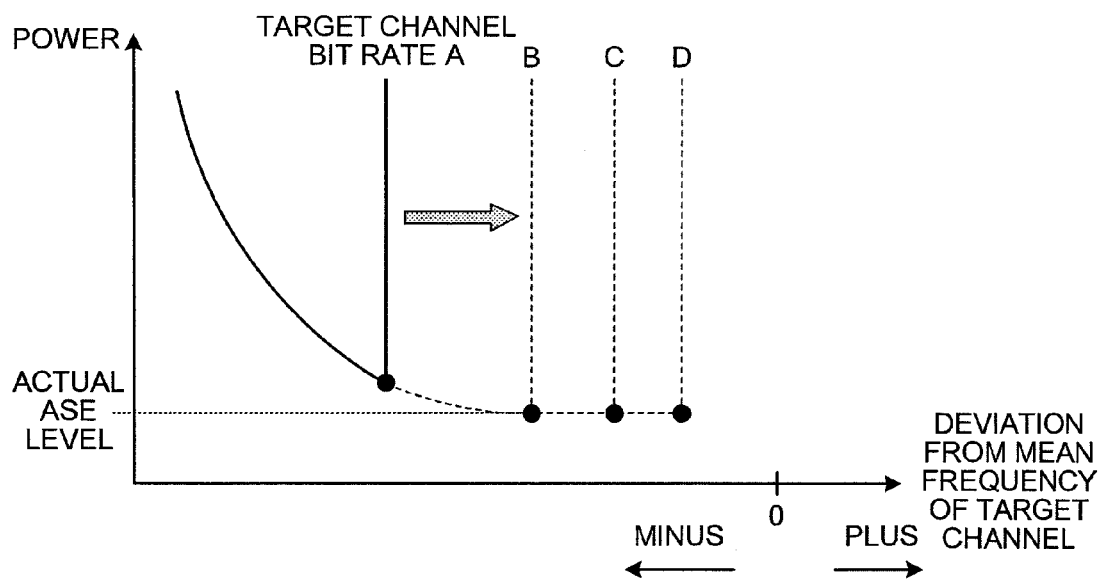
FIG. 9 is a diagram illustrating optimization of a bit rate.

FIG. 8 and FIG. 9 describe optimization of the bit rate. As previously mentioned, when the bit rate of the target channel is high, the base of the signal spectrum 201 of the target channel and the bases of the signal spectrums 202 and 203 of adjacent channels overlap, and the ASE component 204 is buried by the signal spectrums 201, 202, and 203. Hence, the ASE component 204 can not be accurately measured.

Hence, in order to accurately measure the signal spectrum 201, an optimal bit rate must be set. FIG. 8 illustrates the spectrum sample calculation shown in FIG. 2A. As the bit rate is altered, values of an envelope curve 801 of the spectrums in the vicinity of the target channel in FIG. 8 are plotted. FIG. 9 is a graph of the plotted values. The x-axis shows the deviation from the central frequency of the target channel and the y-axis shows the measured spectral power.

As illustrated in FIG. 9, when altering the bit rate from a high bit rate A to a low bit rate D (bit rates A, B, C, and D are in descending order), at the point of the bit rate A, the signal spectrum 201 of the target channel and the bases of the signal spectrums 202 and 203 of adjacent channels (refer to FIG. 15A, FIG. 15B, and FIG. 15C) overlap and hence, ASE level can not be accurately measured.

At the points of the bit rate B, the bit rate C, and the bit rate D, the overlapping of the signal spectrum 201 and the bases of the signal spectrums 202 and 203 of adjacent channels disappears and the minimum spectral power becomes a constant value. At this point, the minimum value of the spectral power is taken be the actual ASE level. Further, the bit rate at this point (e.g., bit rate B), is deemed as the optimal bit rate.

By the method described in FIG. 6 and FIG. 7, resolution of the spectrum analyzer is optimized. Through the method described in FIG. 8 and FIG. 9, by the optimization of the transmitting unit, accurate measurement of OSNR becomes possible.

The order in which the methods (optimization of spectrum analyzer resolution and optimization of transmitting unit bit rate) are conducted is irrelevant. To obtain more accurate OSNR measurements, these methods should be repeated multiple times. Also, when the target channel is set for an optical CW, bit rate optimization for the transmitting unit may be omitted.

Figure 10:
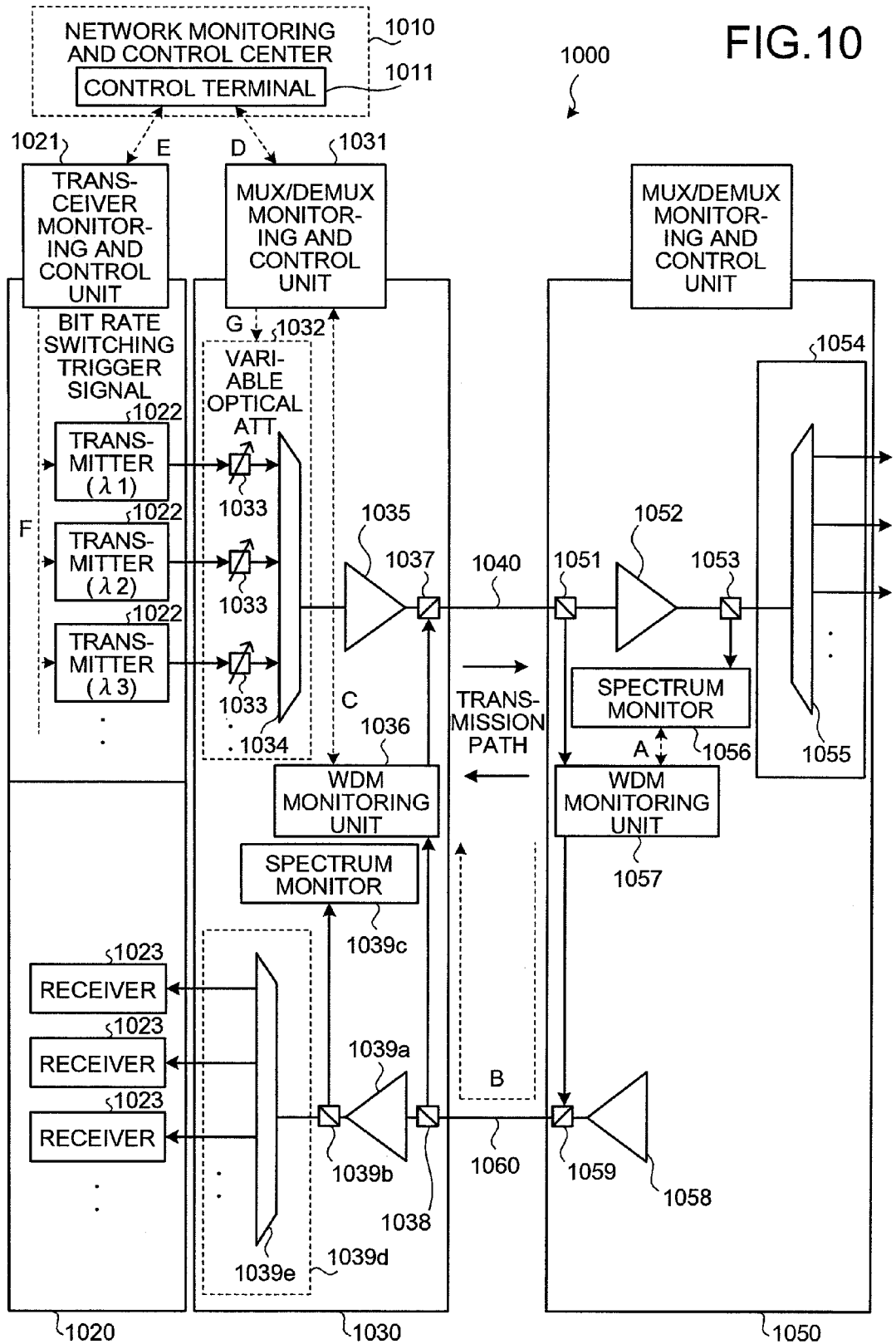
FIG. 10 is a block diagram of a communication system according to the embodiment.

FIG. 10 is a block diagram of a communication system 1000 according to an embodiment of the present invention. The communication system 1000 employs an OSNR measuring apparatus of the present invention and performs preemphasis processing. As illustrated in FIG. 10, the communication system 1000 includes a network monitoring and control center 1010, a transceiving block 1020, a first MUX/DEMUX block 1030, a first transmission path 1040, a second MUX/DEMUX block 1050, and a second transmission path 1060.

The network monitoring and control center 1010 monitors and controls the entire network. A control terminal 1011 included in the network monitoring and control center 1010 monitors and controls the network over which the transceiving block 1020 and first MUX/DEMUX block 1030 communicate. In particular, the control terminal 1011 includes a function of the OSNR measuring apparatus. The control terminal 1011 optimizes the bit rate of a transmitter in the transceiving block 1020 and the resolution of a spectrum monitor 1056 in the second MUX/DMUX block 1050. In addition to OSNR measuring, the control terminal 1011 also performs preemphasis processing.

The transceiving block 1020 includes a transceiver monitoring and control unit 1021, transmitters 1022, and receivers 1023. The transceiver monitoring and control unit 1021 conducts the sending and receiving of data by the monitoring and control of the transmitters 1022 and the receivers 1023. In particular, in the present invention, by sending a bit rate switching trigger signal (in FIG. 10, dotted line "F") to the transmitters 1022 based on the bit rate control signal (in FIG. 10, dotted line "E") received from the network monitoring and control center 1010, the transceiver monitoring and control unit 1021 controls the bit rate of the optical signal sent by the each transmitter 1022.

A plurality of the transmitters 1022 is provided and each transmitter 1022 sends an optical signal (hereinafter, "data signal") having a different wave length (λ1, λ2, λ3 . . . ) to the first MUX/DEMUX block 1030. Each transmitter 1022 includes a function of the transmitting unit 300 or the transmitting unit 500. In other words, each transmitter 1022, based on the bit rate switching trigger signal (dotted line "F") sent from the transceiver monitoring and control unit 1021, alters the bit rate of the optical signal to be sent.

In the transceiving block 1020, even if there are transmitters 1022 in operation, new transmitters 1022 can be added. For example, in FIG. 10, when the λ1 transmitter 1022 and the λ3 transmitter 1022 are in operation, the λ2 transmitter 1022 can be added as a new channel.

A plurality of the receivers 1023 is provided and each receiver 1023 receives data signals that are sent by the transceiving block 1020 and divided by the first MUX/DEMUX block 1030.

The first MUX/DEMUX block 1030 includes a MUX/DEMUX monitoring and control unit 1031, an MUX unit 1032, a first amplifier 1035, a WDM monitoring unit 1036, a first multiplexer 1037, a first branching filter 1038, a second amplifier 1039a, a second branching filter 1039b, a spectrum monitor 1039c, a DEMUX unit 1039d, and a third branching filter 1039e.

The MUX/DEMUX monitoring and control unit 1031 monitors and controls the MUX unit 1032 and the DEMUX unit 1039d. In particular, in the present invention, the MUX/DEMUX monitoring and control unit 1031, according to the preemphasis signal received from the network monitoring and control center 1010 (dotted line "D"), controls a variable optical attenuator 1033 of the MUX unit 1032 and optimizes the transmission level of the target channel.

The MUX unit 1032 includes multiple variable optical attenuators 1033, and a second multiplexer 1034. The quantity of variable optical attenuators 1033 provided corresponds to the quantity of transmitters 1022 in the transceiving block 1020 and each of the variable optical attenuators 1033 receives an optical signal sent from a respective transmitter 1022. Each of the variable optical attenuators 1033, according to the preemphasis signal (dotted line "G") sent from the MUX/DEMUX monitoring and control unit 1031, attenuates the signal level of the received optical signal and sends the attenuated optical signal to the second multiplexer 1034. The second multiplexer 1034 multiplexes the optical signal sent from each of the variable optical attenuators 1033 and sends the multiplexed signal to the first amplifier 1035.

The first amplifier 1035 amplifies the optical signal sent from the second multiplexer 1034 and sends the amplified optical signal to the first multiplexer 1037. The WDM monitoring unit 1036 monitors the spectral data (dotted line "B") sent from the second MUX/DEMUX block 1050 and sends the spectral data to the MUX/DEMUX monitoring and control unit 1031 (dotted line "C").

The WDM monitoring unit 1036 monitors the resolution control signal (dotted line "C") sent from the MUX/DEMUX monitoring and control unit 1031, and sends the signal to the first multiplexer 1037. The first multiplexer 1037 multiplexes the optical signal sent from the first amplifier 1035 and the resolution control signal sent from the WDM monitoring unit 1036, and sends the multiplexed signal through the first transmission path 1040 to the second MUX/DEMUX block 1050.

The first branching filter 1038 receives the optical signal sent from the second MUX/DEMUX block 1050 through the second transmission path, and separates the received optical signal into spectral data and a data signal. The first branching filter 1038 sends the separated spectral data to the WDM monitoring unit 1036 (dotted line "B") and the data signal to a second amplifier 1039a. The second amplifier 1039a, the second branching filter 1039b, the spectrum monitor 1039c, the DEMUX unit 1039d, and the third branching filter 1039e have the same configuration as the second MUX/DEMUX block 1050 and as such their description is herein omitted.

The second MUX/DEMUX block 1050 includes a first branching filter 1051, a first amplifier 1052, a second branching filter 1053, a DEMUX unit 1054, a spectrum monitor 1056, a WDM monitoring unit 1057, a second amplifier 1058, and a multiplexer 1059. The first branching filter 1051 receives an optical signal sent from the first MUX/DEMUX block 1030 that passes through the first transmission path 1040, separates the optical signal into a data signal and a resolution control signal, and sends the data signal to the first amplifier 1052 and the resolution control signal to the WDM monitoring unit 1057.

The first amplifier 1052 amplifies the data signal sent from the first branching filter 1051 and then sends the amplified data signal to the second branching filter 1053. The second branching filter 1053 separates the data signal sent from the first amplifier 1052 and sends the separated signals respectively to the DEMUX unit 1054 and the spectrum monitor 1056. The DEMUX unit 1054 includes a third branching filter 1055. The third branching filter 1055 separates the data signal sent from the second branching filter 1053 (demultiplexing) and sends each of the separated data signals respectively to transceiving blocks.

The spectrum monitor 1056 measures the spectral data from the wave pattern of the data signal sent from the second branching filter 1053. The spectrum monitor 1056, according to the resolution control signal (dotted line "A") sent from the WDM monitoring unit 1057, can modify the resolution when the spectral data is measured. The spectrum monitor 1056 sends the obtained spectral data to the WDM monitoring unit 1057 (dotted line "A").

The WDM monitoring unit 1057 monitors the incoming resolution control signal sent from the first MUX/DEMUX block 1030 passing through the first branching filter 1051 and sends the resolution control signal to the spectrum monitor 1056 (dotted line "A"). The WDM monitoring unit 1057 monitors the spectral data (dotted line "A") sent from the spectrum monitor 1056 and sends the spectral data to the multiplexer 1059 (dotted line "B"). The second amplifier 1058 amplifies the data signal sent from the transceiving block (not shown in figure) and sends the amplified data signal to the multiplexer 1059.

The multiplexer 1059 multiplexes the spectral data sent from the WDM monitoring unit 1057 and the data signal sent from the second amplifier 1058, and sends the multiplexed optical signal through the second transmission path 1060 to the first MUX/DEMUX block 1030 (dotted line "B").

Here, the first transmission path 1040 and the second transmission path 1060 are setup separately, however, by the utilization of various multiplexing schemes, a single transmission path configuration is also possible. In addition, each of the amplifiers including the first amplifier 1035, the first amplifier 1052, the second amplifier 1058, and the second amplifier 1039a are EDFAs, etc.

The dotted lines "A" to "G" shown in FIG. 10 can be realized by the utilization of the optical service channel (OSC) of the communication system 1000 according to an embodiment of the present invention.

In this way, by the transmission of the bit rate switching trigger signal to the transmitter 1022, the spectral width of the optical signal sent from the target channel (e.g., the λ2 transmitter 1022) is reduced and this optical signal is sent to the spectrum monitor 1056. Hence, the spectral data measured by the spectrum monitor 1056 from the optical signal sent from the target channel is received by the control terminal 1011 of the network monitoring and control center 1010.

By the transmission of the resolution control signal for the spectrum monitor 1056, the control terminal 1011, appropriately adjusts the resolution of the spectrum monitor 1056 and receives spectral data measured by the adjusted spectrum monitor 1056. In this way, the control terminal 1011 is able to accurately measure OSNR at the target channel.

The control terminal 1011 of the network monitoring and control center 1010 monitors and controls the network over which the transceiving block 1020 and the first MUX/DEMUX block 1030 communicate. The case of OSNR measuring has been described, however, the embodiment pertaining to ONSR measurement is not limited to this method. For example, the transceiving block 1020 and the first MUX/DEMUX block 1030 may be a combined single-unit transceiver and the transceiver may have the ability to measure OSNR.

Figure 11A:
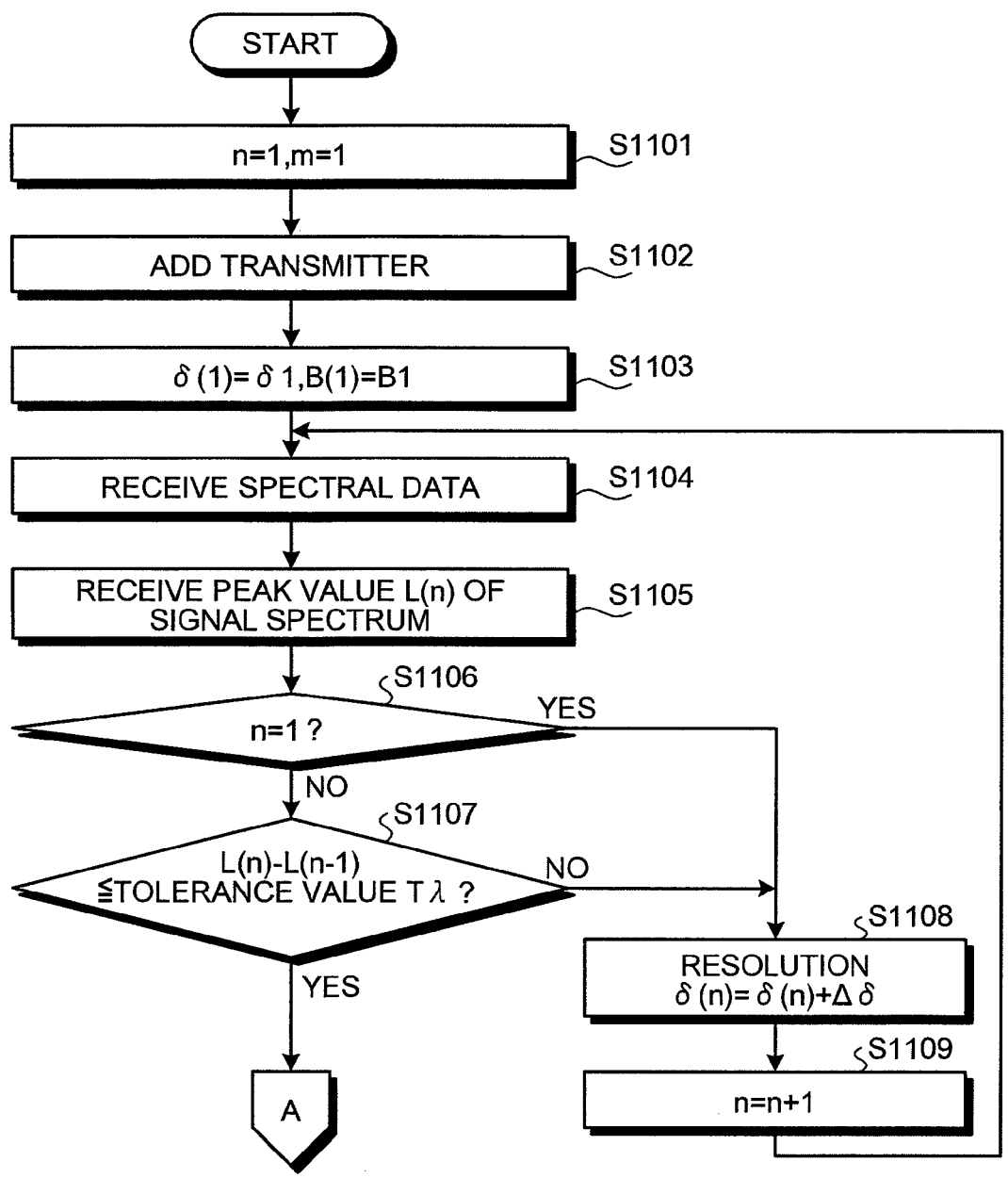
FIG. 11A is a flowchart illustrating a preemphasis processing of the communication system.
Figure 11B:
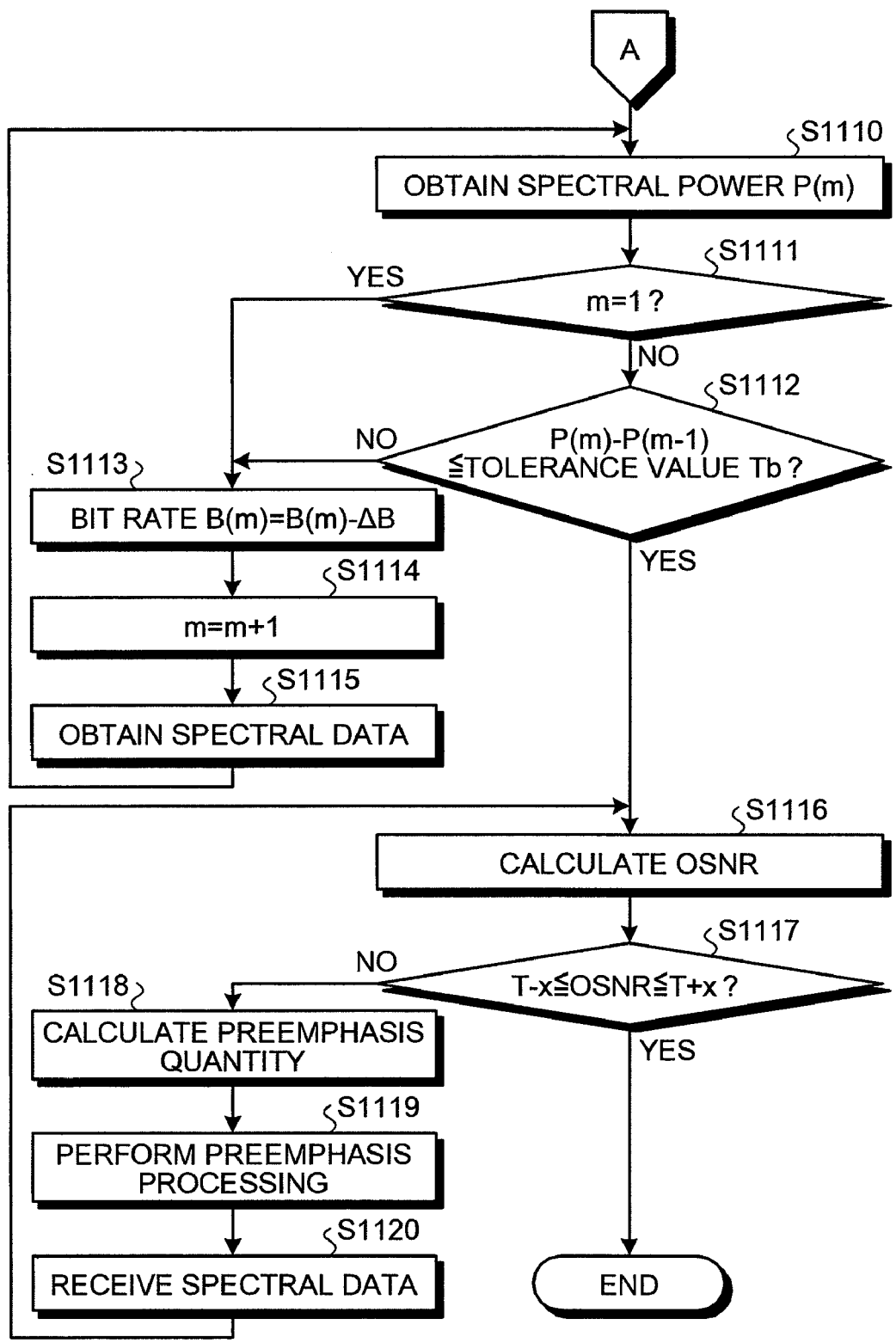
FIG. 11B is a flowchart illustrating a preemphasis processing of the communication system.

FIG. 11A and FIG. 11B are flowcharts illustrating the preemphasis processing of the communication system according to an embodiment of the present invention. In the communication system 1000 according to an embodiment of the present invention, for example, the control terminal 1011 of the network monitoring and control center 1010 may perform preemphasis processing.

Here, a case has been described where the transmitters 1022 indicated by the reference characters "λ1" and "λ3" in FIG. 10 are in operation and the transmitter 1022 indicated by the reference character "λ2" is to be added as a new channel, OSNR at the "λ2" transmitter 1022 is measured and the case in which preemphasis is performed based on the results of the OSNR measurement is herein described.

As illustrated in FIG. 11A, n=1 and m=1 (step S1101), and the "λ2" transmitter 1022 is added to the transceiver monitoring and control unit 1021 (step S1102). By the transmission of a resolution control signal to the spectrum monitor 1056, the initial value δ(1) of the resolution δ(n) of the spectrum monitor 1056 is assigned an appropriate value of "initial value 1" and by the transmission of the bit rate switching trigger signal to the transmitter 1022, the initial value B(1) of the bit rate B(m) is assigned an appropriate value of "initial value B1" (step S1103).

Spectral data from the spectrum monitor 1056 is received (step S1104) and from the received spectral data, spectral peak L(n) of the signal is obtained (step 1105). Next, whether the variable n has a value of "1" or not is determined (step S1106). In other words, at step S1106, in order to determined whether or not the resolution δ(n) is the optimal value (refer to step S1107 below), it must be determined whether or not a value of 2 or greater has been obtained for the spectral peak L(n) of the signal.

At step S1106, if the variable n is not 1 (step S1106: NO), whether or not the difference between L(n) and L(n−1) is equal to or less than the resolution convergence tolerance Tλ (step S1107) is determined. In other words, at step S1107, by comparing the value of the current spectral peak L(n) and the value of the previous spectral peak L(n−1), whether the spectral peak L(n) is constant with the actual signal level or not (refer to FIG. 7) is determined.

At step S1106, if the variable n equals 1 (step S1106: YES), or at step S1107, if the difference between L(n) and L(n−1) is not equal to or less than the resolution convergence tolerance Tλ (step 1107: NO), by the transmission of the resolution control signal sent to the spectrum monitor 1056, the resolution δ(n) is raised only by a predetermined adjustment amount Δδ (step S1108). At step S1109, 1 is added to the variable n and the process returns to step S1104 and continues.

At step S1107, if the difference between L(n) and L(n−1) is equal to or less than the resolution convergence tolerance Tλ (step S1107: YES), the process moves to step S1110 in FIG. 11B. Steps S1104 to S1109 are steps to determine and set the optimal resolution (refer to FIG. 6 and FIG. 7). In other words, as the resolution δ(n) is adjusted, an optimal range in which the spectral peak L(n) of the spectral signal 201 becomes constant with that of the actual signal level is sought and a resolution δ(n) in the found range is set as the optimal resolution.

As illustrated in FIG. 11B, spectral power P is obtained from the received spectral data at step S1104 (step S1110). Here, the spectral data is the final spectral data that has passed through steps S1104 to S1109, i.e., the spectral data at the determination of the optimal resolution.

At step S1111, whether variable m is equal to 1 or not is determined. In other words, at step S1111, in order to determine whether or not the bit rate B(m) is optimal (refer to step S1112 below), it must be determined whether or not a spectral power P(m) of 2 or greater has been obtained.

At step S1111, if the variable (m) is not 1 (step S1111: NO), then whether or not the difference between P(m) and P(m−1) is equal to or less than the bit rate convergence tolerance Tb (step S1112) is determined. In other words, at step S1112, by comparing the value of the current spectral power P(m) and the value of the previous spectral power P(m−1), whether the spectral power P(m) is constant with the actual ASE level or not (refer to FIG. 9) is determined.

At step S1111, if the variable m equals 1 (step S1111: YES), or at step S1111, if the difference between P(m) and P(m−1) is not equal to or less than the bit rate convergence tolerance Tb (step S1112: NO), by the transmission of the bit rate switching trigger signal to the transmitter 1022, the bit rate B(m) of the transmitter 1022, is reduced by only a predetermined adjustment amount ΔB (step S1113). At step S1114, 1 is added to the variable m, the spectral data is re-received from the spectrum monitor 1056 (step S1115), and the process returns to step S1110 and continues.

At step S1112, if the difference between P(m) and P(m−1) is equal to or less than the bit rate convergence tolerance Tb (step S1112: YES), the process moves to step S1116. Steps S1110 to S1115 are steps to determine and set the optimal bit rate (refer to FIG. 8 and FIG. 9). In other words, as the bit rate B(m) is adjusted, an optimal range in which the spectral power P(m) becomes constant with that of the actual ASE level is sought and a bit rate B(m) in the found range is set as the optimal resolution.

The last received spectral data at this point is used to calculate OSNR (step S1116). In other words, by calculating the ratio of the spectral peak L(n) corresponding to the optimal resolution δ(n) determined at step S1107 (the peak value 601 of the actual signal spectrum 201, refer to reference character 601 in FIG. 6) and the spectral power P(m) corresponding to the optimal bit rate B(m) determined at step S1112 (the power of the actual ASE component, refer to reference character 204 in FIG. 8), OSNR is calculated for the λ2 transmitter 1022.

At step S1116, whether the calculated OSNR for the λ2 transmitter 1022 falls within a range of +/−X (standard criteria) (step S1117) of the average OSNR values T for other transmitters 1022 or not is determined. If the OSNR for the λ2 transmitter 1022 does not fall within the acceptable range (step S1117: NO), based on the OSNR for the λ2 transmitter 1022 and the average OSNR values T, a preemphasis quantity is calculated (step S1118), and according to the calculated preemphasis quantity, preemphasis processing is performed for the λ2 transmitter 1022 (step S1119).

In other words, by sending a preemphasis control signal through the MUX/DEMUX monitoring and control unit 1031 to the variable optical attenuator 1033 requiring control, the output level of the optical signal of the transmitter can be attenuated to thereby equalize the OSNR of each of the transmitters 1022.

At step S1120, the spectral data from the spectrum monitor 1056 is re-received (step S1120), and the process returns to step S1116 and continues. If OSNR for the λ2 transmitter 1022, falls within a range of +/−X (standard criteria) relative to the average OSNR values T for other transmitters 1022 (step S1117:YES), preemphasis processing is not necessary and one series of processing is concluded.

Here, after the optimal resolution is set, the optimal bit rate is set. However, these procedures are not limited to this order. Furthermore, at step S1120, after the preemphasis processing at step S1119, spectral data is obtained again and OSNR is recalculated for confirmation. However, this confirmation procedure may be omitted. In other words, after the preemphasis processing at step S1119, the series of processing steps may be concluded.

Although at step S1107, the optimal resolution is set, by the modification of the transmitter 1022 bit rate B(m) at steps S1110 to S1115, the spectral data measured by the spectrum monitor 1056 changes, and hence, the set resolution δ(n) may not be the optimal value. As such, at step S1112, after setting the optimal bit rate, reconfirmation of the resolution δ(n) may be performed to verify the optimal resolution. In the event that the resolution δ(n) is not the optimal resolution, the optimal resolution is sought again and set.

Further in order to reset the optimal resolution, by changing the resolution δ(n), the spectral data measured by the spectrum monitor 1056 changes and the bit rate B(m) that is set may no longer be the optimal value. As such, after resetting the optimal resolution, reconfirmation of the optimal bit rate B(m) may be performed to verify that it is the optimal value. In the event that the bit rate B(m) is not the optimal value, the bit rate is sought for again and set.

In the case the optical signal sent by the transmitters is a CW light, the setting of an optimal bit rate is not necessary and hence, steps S1110 to S1115 can be omitted.

As described above, according to the OSNR measuring apparatus and the OSNR measuring method according to the present invention, the reduction of the spectrum width of the optical signal of the target channel enables the ASE component to be accurately measured. Further, by setting an optimal resolution for the spectrum monitor, the peak value of the signal spectrum can be measured. Hence, for a densely multiplexed optical fiber communication system having a high bit rate, accurate measurement of OSNR can be achieved.

According to the embodiments mentioned above, in order to reduce the spectrum width of the signal spectrum 201 of the target channel, the lowering of the bit rate of the target channel has been described. However, if NRZ modulation is employed, without lowering the actual bit rate, by utilizing a fixed bit pattern, pseudo lowering of the bit rate can be achieved.

For example, a 10-Gbps fixed bit pattern "1010 . . . " is transmitted from the target channel. Next, a 10-Gbps fixed bit pattern "1111000011110000 . . . " is transmitted. As a result, pseudo lowering of the bit rate is achieved, the spectrum width of the signal spectrum of the target channel narrows, and in similar to lowering the actual bit rate of the target channel, OSNR can be accurately measured.

Further, according to the embodiments mentioned above, by lowering the bit rate of the target channel, spectrum width of the signal spectrum 201 narrows and enables accurate measurement of OSNR. In order to decrease the spectrum width of the signal spectrum 201, rather than lowering the bit rate, modulation may be alternatively performed.

For example, if the target channel is modulated by return to zero (RZ) modulation, by changing the modulation method to NRZ, the spectrum width of the signal spectrum 201 decreases and similar to actually lowering the bit rate of the target channel, OSNR can be accurately measured.

As described above, accurate OSNR measurement is effected for optical fiber communication having a high bit rate and a densely multiplexed channel space.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A measuring apparatus that measures an optical signal noise ratio (OSNR) of a communication channel in a wavelength division multiplexing (WDM) optical communications system, comprising:
   a reducing unit that, by lowering a bit rate of an optical signal sent to a target channel to a given value other than 0, reduces a spectral width of the optical signal until measurement of an amplified spontaneous emission of the target channel becomes possible;
   a receiving unit that receives spectral data measured from the optical signal; and
   a measuring unit that measures the OSNR of the target channel based on the spectral data.

2. The measuring apparatus according to claim 1, further comprising a resolution modification unit that modifies resolution for measuring the spectral data, wherein
   the receiving unit receives the spectral data measured based on the modified resolution.

3. The measuring apparatus according to claim 1, wherein the reducing unit reduces the spectral width by changing a coding method of the optical signal.

4. The measuring apparatus according to claim 3, wherein
the coding method is a return to zero method, and
the reducing unit reduces the spectral width by changing the coding method to a non-return-to-zero method.

5. The measuring apparatus according to claim 2, wherein a spectrum measuring resolution band of the resolution modification unit has a width that accommodates all components of the optical signal fit.

6. The measuring apparatus according to claim 2, wherein a spectrum measuring resolution band of the resolution modification unit has a width that does not accommodate a spectral component of signal of a channel adjacent to the target channel.

7. The measuring apparatus according to claim 1, wherein the receiving unit receives the spectral data through the optical service channel of the WDM optical communications system.

8. A measuring method of measuring an OSNR of a communication channel in a WDM optical communications system, comprising:
reducing, by lowering a bit rate of an optical signal sent to a target channel to a given value other than 0, a spectral width of the optical signal until measurement of an amplified spontaneous emission of the target channel becomes possible;
receiving spectral data measured from the optical signal; and
measuring the OSNR of the target channel based on the spectral data.

9. The measuring method according to claim 8, further comprising modifying resolution for measuring the spectral data, wherein
the receiving includes receiving the spectral data measured based on the modified resolution.

10. The measuring method according to claim 9, wherein a spectrum measuring resolution band at the modifying is set to have a width that accommodates all components of the optical signal fit.

* * * * *